United States Patent [19]
Nishi et al.

[11] Patent Number: 5,815,231
[45] Date of Patent: Sep. 29, 1998

[54] LIQUID CRYSTAL DISPLAY AND METHOD OF MANUFACTURING THE SAME

[75] Inventors: Takeshi Nishi; Toshimitsu Konuma; Takahiro Tsuji, all of Kanagawa; Yoshitaka Yamamoto, Nara; Masahiro Adachi, Nara; Kiyoshi Ogishima, Nara, all of Japan

[73] Assignees: Semiconductor Energy Laboratory Co., Ltd., Kanagawa-ken; Sharp Kabushiki Kaisha, Osaka, both of Japan

[21] Appl. No.: 767,316

[22] Filed: Dec. 16, 1996

[30] Foreign Application Priority Data

Dec. 19, 1995  [JP]  Japan .................................. 7-349227

[51] Int. Cl.⁶ .......................... G02F 1/1345; G02F 1/1339
[52] U.S. Cl. ........................................ 349/151; 349/155
[58] Field of Search ...................................... 349/151, 155

[56] References Cited

U.S. PATENT DOCUMENTS

| | | | |
|---|---|---|---|
| 5,148,301 | 9/1992 | Sawatsubashi et al. | 349/151 |
| 5,247,375 | 9/1993 | Mochizuki et al. | 349/151 |
| 5,250,931 | 10/1993 | Misawa et al. | 349/151 |
| 5,328,728 | 7/1994 | Swirbel et al. | 349/155 |

FOREIGN PATENT DOCUMENTS

| | | | |
|---|---|---|---|
| 61-2129 | 1/1986 | Japan | 349/155 |
| 4-204417 | 7/1992 | Japan | 349/155 |

*Primary Examiner*—Anita Pellman Gross
*Attorney, Agent, or Firm*—Fish & Richardson P.C.

[57] ABSTRACT

There is provided an active matrix liquid crystal display having high reliability with improved yield of production.

In an active matrix liquid crystal display in which peripheral driving circuits are in contact with a liquid crystal material, spacers are dispersed in peripheral driving circuit regions in a density lower than that in a pixel region to reduce damage to the peripheral driving circuits and to improve production yield and reliability of products.

11 Claims, 8 Drawing Sheets

LIQUID CRYSTAL DISPLAY AND METHOD OF MANUFACTURING THE SAME

BACKGROUND OF THE INVENTION

1. Field of the Invention

The present invention relates to a configuration of an active matrix liquid crystal display having thin film transistors for pixels and thin film transistors for peripheral driving circuits on the same substrate.

2. Description of the Related Art

Figure 4:
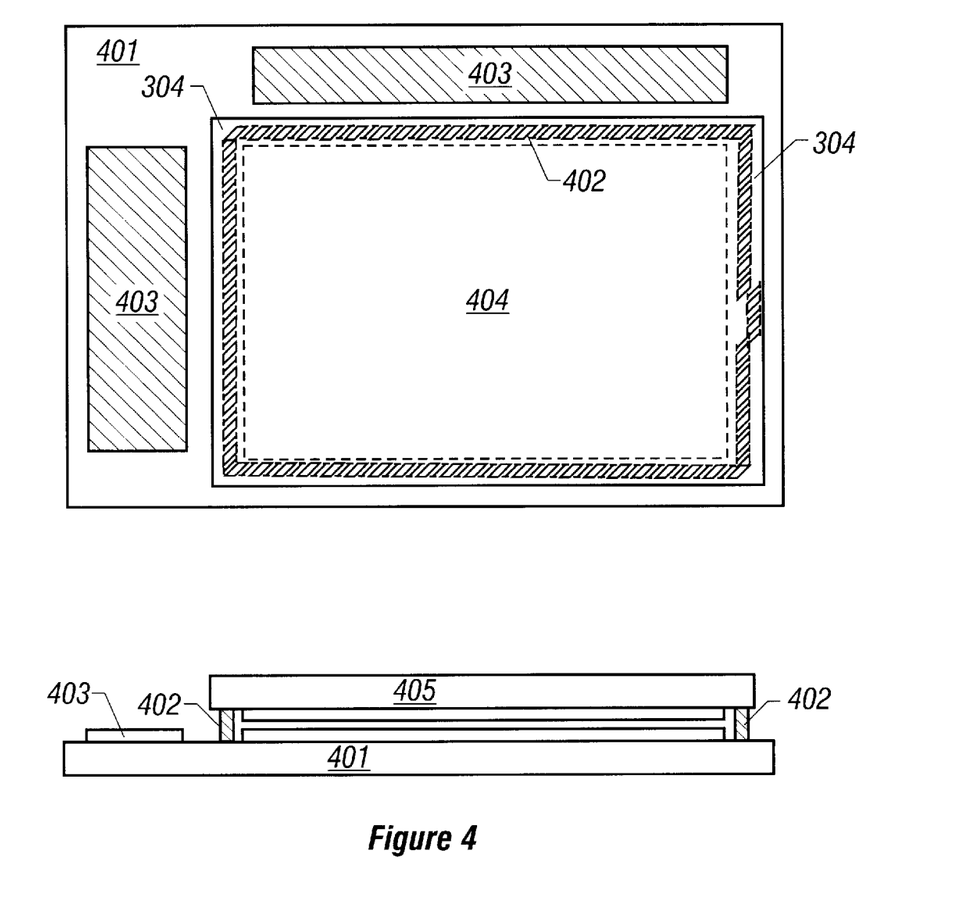
FIG. 4 schematically shows a conventional active matrix liquid crystal display.

FIG. 4 shows a configuration of a panel forming a part of a conventional active matrix liquid crystal display. As apparent from FIG. 4, a pixel region 404 has been enclosed by an opposite substrate 405 and a sealant 402 (also referred to as "seal material") while thin film transistors (hereinafter referred to as "TFT") in peripheral driving circuit regions 403 have been exposed to the atmosphere.

Therefore, it has been necessary to be very careful in handling the substrate of an active matrix liquid crystal display at a panel assembly process. Under such circumstances, there has been a need for a configuration of an active matrix liquid crystal display which makes handling in manufacturing processes easier.

Further, the presence of the opposite substrate 405 above the pixel region protects the pixel region 404 as a consequence. However, the peripheral driving circuits 403 are merely covered by a thin oxide film and actually show weakness in anti-humidity characteristics and against contamination. Problems have arisen also in the aspect of reliability.

SUMMARY OF THE INVENTION

Methods were conceived to address such problems in which peripheral driving circuits 403 of an active matrix liquid crystal display are configured to inhibit direct access thereto and in which the region where the opposite substrate resides is extended to the areas where the peripheral driving circuits are formed to include the peripheral driving circuits in a region where a liquid crystal material is present. Such methods are disclosed in Japanese patent application No. H7-50527 (Japanese Laid-Open Application: H8-220560, Date of Laid-Open: Aug. 30, 1996).

However, the following problems have arisen in such a configuration.

Among steps for assembling a liquid crystal display, a step of bonding two opposite substrates generally employs a process of hardening the sealant while applying a pressure vertically to the surfaces of the substrates. For a normal liquid crystal display, spacers are interposed between the two substrates to maintain a predetermined interval between the two substrates. Therefore, a pressure is applied through the spacers to devices and the like formed on the substrates at this step.

Especially, in the case of a liquid crystal display having the configuration described above, the opposite substrate extending to the peripheral driving circuits has extended the pressure also to the peripheral driving circuits through the spacers.

In the peripheral driving circuit regions, TFTs are provided in a density higher than that in the pixel region. Therefore, when the spacers are dispersed in a uniform density throughout the substrate as in conventional liquid crystal displays, the spacers cause more damage in the peripheral driving circuits than in the pixel region. This reduces reliability and yield.

In order to solve the above-described problems, according to the present invention, an active matrix liquid crystal display is configured as follows.

Specifically, there is provided an active matrix liquid crystal display wherein thin film transistors provided in a pixel region and thin film transistors provided in peripheral driving circuit regions reside on the same substrate, characterized in that there is a difference in the dispersion density of spacers between the pixel region and the peripheral driving circuit regions.

As another configuration, there is provided an active matrix liquid crystal display wherein thin film transistors provided in a pixel region and thin film transistors provided in peripheral driving circuit regions reside on the same substrate, characterized in that spacers are present in the pixel region and are not present in the peripheral driving circuit regions.

When an active matrix liquid crystal display is configured such that thin film transistors disposed in a pixel region and thin film transistors forming peripheral driving circuit regions of an active matrix liquid crystal display are integrated on the same substrate, in the above-described configuration, a mask is provided in the regions wherein the TFTs for the peripheral driving circuit regions reside when the spacers are dispersed to inhibit the spacers from being dispersed therein to improve the reliability of the peripheral driving circuits, thereby improving the yield of the peripheral driving circuits.

In a case that a means utilizing static electricity is used as a method of dispersing spacers, better methods for applying a voltage for generating static electricity are pursued. For example, when spacers are dispersed to improve the reliability of peripheral driving circuits, the spacers are dispersed in a lower density in the regions where the TFTs for the peripheral driving circuits reside by applying a voltage at a value different from that applied to the region where pixel TFTs reside to improve the yield of the peripheral driving circuits.

Further, when the spacers are dispersed, the dispersion density of the spacers is made lower in the regions on the stage carrying the substrates of an active matrix liquid crystal display where the TFTs for the peripheral driving circuits reside by applying a voltage thereto at a value different from that applied to the region where the pixel TFTs reside, thereby improving the yield of the peripheral driving circuits. Alternatively, when the spacers are dispersed, the voltage for generating static electricity is not applied to the regions where the TFTs for the peripheral driving circuits reside and the potential for generating static electricity is applied only to the region where the pixel TFTs reside. This allows the spacers to be selectively dispersed only in the pixel region. Further, the density of the spacers dispersed in the peripheral driving circuit regions may be reduced.

When peripheral driving circuit regions are included in a region wherein liquid crystals are present, damage to the TFTs forming the peripheral driving circuits caused by the presence to spacers is reduced by lowering the density of the spacers dispersed in the peripheral driving circuit regions or by inhibiting the spacers from being dispersed in the peripheral driving circuit regions. Thus, it is possible to improve the reliability of a liquid crystal display having a configuration wherein a pixel region and peripheral driving circuits are formed on the same substrate.

DETAILED DESCRIPTION OF THE PREFERRED EMBODIMENTS

First Embodiment

Steps of assembling an active matrix liquid crystal display according to the present embodiment will be described below.

In the present embodiment, no-alkali glass is used as a substrate. First, a pixel region having a matrix-shaped configuration and peripheral driving circuits for driving the pixel region are provided on this glass substrate using a well known method or an appropriate method. In the pixel region, at least one thin film transistor as a switching device is provided on each of pixel electrodes provided in a quantity on the order of several hundreds by several hundreds.

In the peripheral driving circuit regions, circuits for driving the thin film transistors provided in the pixel region are configured using thin film transistors. As the peripheral driving circuits, shift registers and address decoders are used.

Each of the TFT substrate and a color filter substrate is subjected to cleaning to sufficiently remove various chemicals such as an etchant and resist remover used for surface treatment.

Next, orientation films are formed on the substrate having TFTs formed thereon (hereinafter referred to as "TFT substrate") produced using the method described above and a substrate having a color filter formed thereon (hereinafter referred to as "color filter substrate"). The orientation films are formed from a material obtained by dissolving polyimide by approximately 10% by weight in a solvent such as butyl cellosolve, n-methyl-2-pyrolidone, or γ-butyrolactone. This is referred to as polyimide varnish. In this embodiment, AL-3046 available from NIPPON SYNTHETIC RUBBER CO. LTD. is used as polyimide varnish burned at low temperatures. The polyimide varnish is applied to the substrates using methods such as the use of a spinner and printing using a flexographic printing apparatus or screen printing apparatus.

Then, the orientation films applied to both of the TFT substrate and color filter substrate are heated and hardened (baked). In the present embodiment, the baking is carried out through heating by feeding hot air at 180° C. to burn and harden the polyimide varnish.

Next, a rubbing step is performed wherein the surfaces of the glass substrates having the orientation films formed thereon are rubbed by buff cloth with hairs having a length of 2 to 3 mm (fiber such as rayon and nylon) in a predetermined direction to form microscopic grooves. Spacers are then dispersed on the TFT substrate. The method of dispersing the spacers will be described later.

Next, a sealant is applied to an outer frame of the TFT substrate. The purpose of the application of the sealant is to bond the TFT substrate and the color filter substrate and to prevent a liquid crystal material injected from being leaking to the outside. A material obtained by dissolving epoxy resin and a phenolic hardener in ethyl cellosolve may be used as the sealant.

The two glass substrates are laminated after applying the sealant. The laminated TFT substrate and color filter substrate are pressed for three hours at 160° C. to heat and harden the sealant, whereby the TFT substrate and the color filter substrate are bonded and secured.

Finally, a liquid crystal material is injected from a liquid crystal injection port of a resultant liquid crystal panel formed by laminating the TFT substrate and the color filter substrate and, thereafter, the liquid crystal injection port is sealed with epoxy type resin. Thus, an active matrix liquid crystal display is assembled.

A method of dispersing the spacers will now be described with reference to FIG. 1. First, the spacers are dispersed on a display region of a substrate 101. Plastic spacers (Micropearl manufactured by SEKISUI FINE CHEMICAL CO. LTD.) having a diameter of 5.0 μm are used as the spacers. The spacers are transported in nitrogen gas and dispersed in a duct 104. The spacers are ejected onto the substrates from a dispersing nozzle 105 provided on the ceiling of a chamber 106 of a dispersing machine. The nozzle is secured to the ceiling with rubber packing and its end is movable in all directions. When the spacers are dispersed, the nozzle is swung in all directions to disperse the spacers uniformly on the substrates. The amount of the spacers dispersed is adjusted to achieve an average dispersion density of 100 pcs./mm$^2$.

Figure 1:
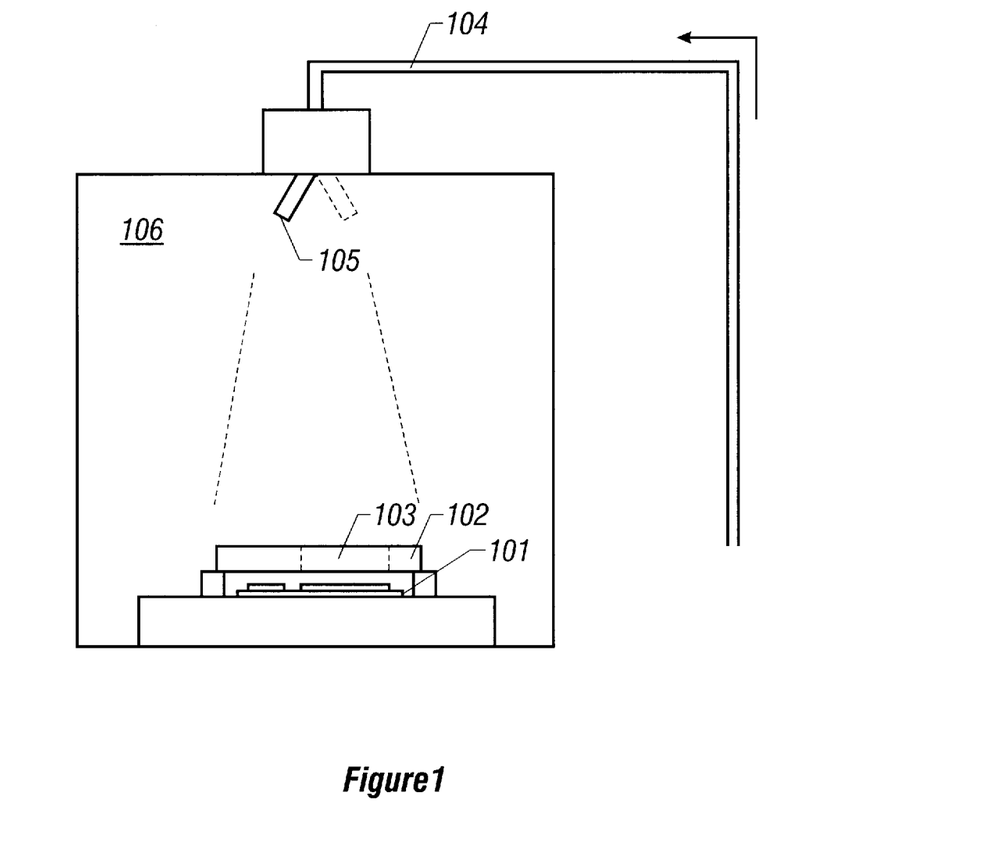
FIG. 1 schematically shows a method of dispersing spacers in a first embodiment of the present invention.

In order to inhibit the spacers from being dispersed in the areas of peripheral driving circuit regions, as shown in FIG. 1, a mask 102 is disposed above the substrate 101 during dispersion so that it does not contact with the substrate. As shown in FIG. 1, the mask is formed with holes 103 in areas excluding those corresponding to the driving circuits. The shape of the holes is 52 mm×16 mm in a location corresponding to the area of source drivers and 8 mm×80 mm in a location corresponding to the area of gate drivers. The interval between the substrate and the mask is 1 mm.

Steps of producing the active matrix circuit of the present invention will now be described with reference to FIGS. 5A through 5E. Steps of producing the TFTs for the peripheral driving circuits are shown on the left side of the figure and steps of producing the TFTs for the active matrix circuit are shown on the right side of the figure.

Figure 5A:
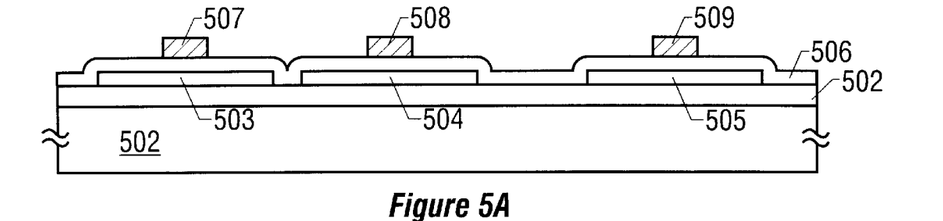
FIGS. 5A through 5E show steps of producing TFTs in the first embodiment of the present invention.

First, a silicon oxide film having a thickness of 1000 to 3000 Å is formed on a non-alkali glass substrate (a quartz substrate may be used instead) 501 as a base oxide film 502. This silicon oxide film may be formed using a sputtering or plasma CVD process in an oxygen atmosphere.

Next, an amorphous or polycrystalline silicon film is formed using a plasma CVD or LPCVD process to a thickness of 300 to 1500 Å, preferably 500 to 1000 Å. The silicon film is then crystallized by performing thermal annealing at a temperature equal to or higher than 500° C., preferably in the range of 800° to 950° C.

The crystallization through thermal annealing may be followed by optical annealing to obtain higher crystallinity. During the crystallization through thermal annealing, an element such as nickel for promoting crystallization of silicon (catalytic element) may be added as described in Japanese Laid-Open Patent Application (KOKAI) Nos. H6-244103 and H6-244104.

The silicon film is then etched to form active layers 503 (for P-channel type TFTs) and 504 (for N-channel type TFTs) of TFTs for the peripheral driving circuits and an active layer 505 of TFTs for the matrix circuit (pixel TFTs) in the form of islands. Further, a sputtering process is performed in an oxygen atmosphere to form a silicon oxide gate insulation film 506 having a thickness of 500 to 2000 Å. The gate insulation film may be also formed using a plasma CVD process. When the silicon oxide film is formed using a plasma CVD process, it is preferable to use dinitrogen oxide ($N_2O$) or oxygen ($O_2$) and mono-silane ($SiH_4$) as material gasses.

Thereafter, a polycrystalline silicon film (including a very small amount of phosphorus for improving conductivity) having a thickness of 2000 Å to 5 μm, preferably 2000 to 6000 Å is formed on the entire surface of the substrate using an LPCVD process. Then, etching is performed to form gate electrodes 507, 508 and 509 (FIG. 5A).

Figure 5B:
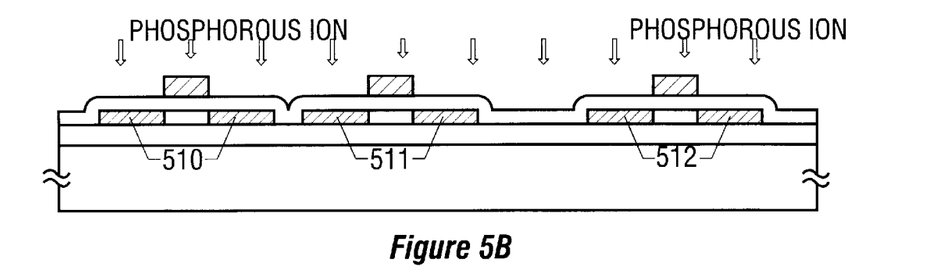

Thereafter, an ion doping process is performed to implant impurity ions on a self-alignment basis into all of the island-shaped active layers using the gate electrodes as a mask. Here, phosphorus is implanted using phosphine ($PH_3$) as a doping gas. The dose is $1 \times 10^{12}$ to $5 \times 10^{13}$ atoms/cm². As a result, weak N-type regions 510, 511 and 512 are formed (FIG. 5B).

Figure 5C:
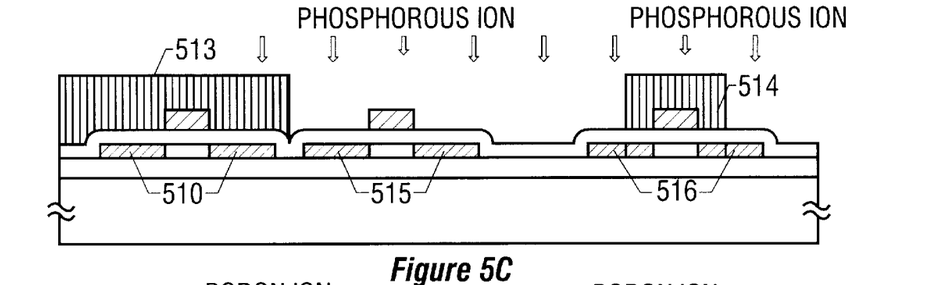

Next, there is formed a photoresist mask 513 covering the active layer 503 of the P-channel type TFTs and a photoresist mask 514 covering a part of the active layer 505 of the pixel TFTs which is parallel to the gate electrode and extends to a position 3 μm off the edges of the gate electrode 509.

Then, an ion doping process is performed again to implant phosphorus using phosphine as a doping gas. The dose is $1 \times 10^{14}$ to $5 \times 10^{15}$ atoms/cm². As a result, strong N-type regions (source/drain) 515 and 516 are formed.

No phosphorus is implanted during this doping in regions 517 covered by the mask 514 of the weak N-type region 512 of the active layer 505 of the pixel TFTs. Therefore, those regions remain weak N-type (FIG. 5C).

Figure 5D:
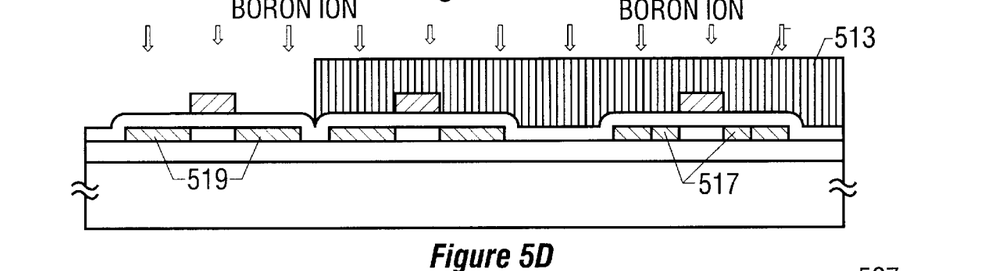

Next, the active layers 504 and 505 of the N-channel type TFTs are covered with a photoresist mask 518, and an ion doping process is performed to implant boron in the island-shaped region 503 using diborane ($B_2H_6$) as a doping gas. The dose is $5 \times 10^{14}$ to $8 \times 10^{15}$ atoms/cm². Since the dose of boron in this doping exceeds the dose of phosphorus shown in FIG. 5C, the previously formed weak N-type region 510 is inverted into a strong P-type region 519.

The above-described doping processes form the strong N-type regions (source/drain) 515, 516, strong P-type region (source/drain) 519, and weak N-type regions (low density impurity region) 517. In the present embodiment, the width x of the low density impurity regions 517 is approximately 3 μm (FIG. 5D).

Figure 5E:
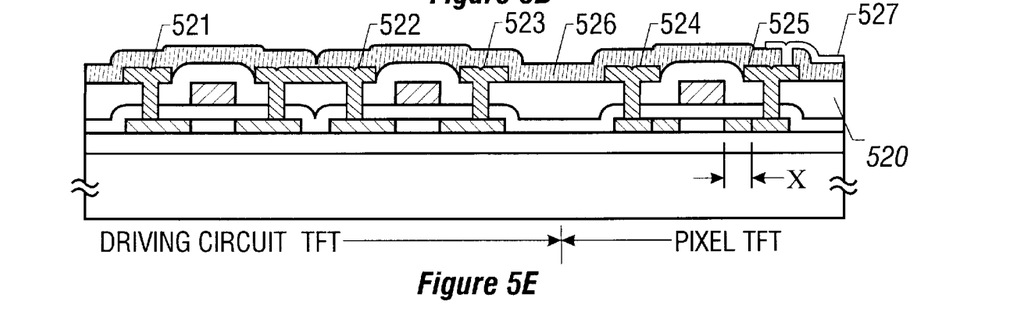

Thereafter, thermal annealing is carried out for 0.5 to 3 hours at 450° to 850° C. to allow recovery from damage caused by doping, to activate the doped impurities, and to allow recovery of the crystallinity of silicon. Then, a silicon oxide film having a thickness of 3000 to 6000 Å is formed on the entire surface using a plasma CVD process as a layer insulator 520. This may be a silicon nitride film or a multilayer film consisting of a silicon oxide film and a silicon nitride film. The layer insulator 520 is then etched using a wet etching process to form a contact hole in the source and drain.

A sputtering process is then performed to form a titanium film having a thickness of 2000 to 6000 Å which is in turn etched to form electrodes/lines 521, 522 and 523 for the peripheral circuits and electrodes/lines 524 and 525 for the pixel TFTs. Further, a plasma CVD process is performed to form a silicon nitride film 526 having a thickness of 1000 to 3000 Å as a passivation film which is then etched to form a contact hole which reaches the electrode 525 of the pixel TFT.

Finally, an ITO (indium tin oxide) film having a thickness of 500 to 1500 521 formed using a sputtering process is etched to form a pixel electrode 527. Thus, the peripheral logic circuit and active matrix circuit are integrally formed (FIG. 5E).

Figure 3:
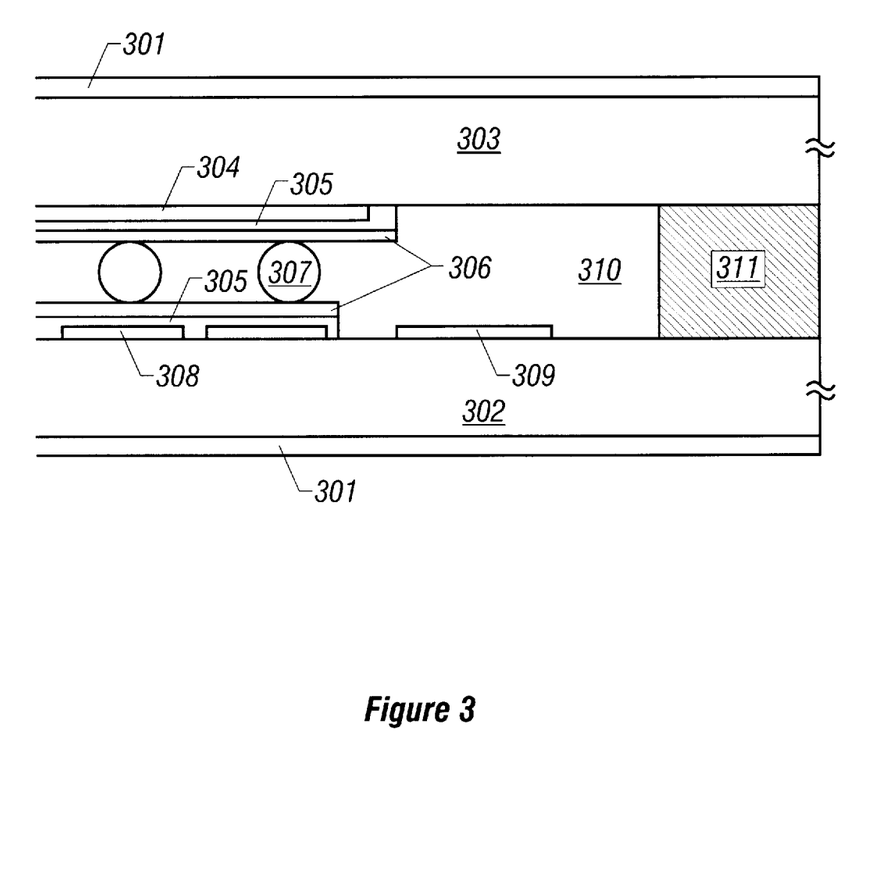
FIG. 3 is a sectional view of an active matrix liquid crystal display of the first embodiment of the present invention.

FIG. 3 is a sectional view of the active matrix liquid crystal display produced in the present embodiment. In FIG. 3, a transparent electrode 305 and an orientation film 306 are formed on one side of a TFT substrate 302 and a polarizing plate 301 is provided on the other side.

Further, a color filter 304, a transparent electrode 305 and an orientation film 306 are formed on one side of a color filter substrate 303, and a polarizing plate 301 is provided on the other side.

A liquid crystal material 310 is sandwiched by the above-described two substrates, and spacers 307 for maintaining a predetermined interval between the two glass substrates are present in the liquid crystal material in dispersion densities which depend on regions. In the present embodiment, the dispersion density of the spacers in the peripheral driving circuit region 309 is 0.

Figure 7:
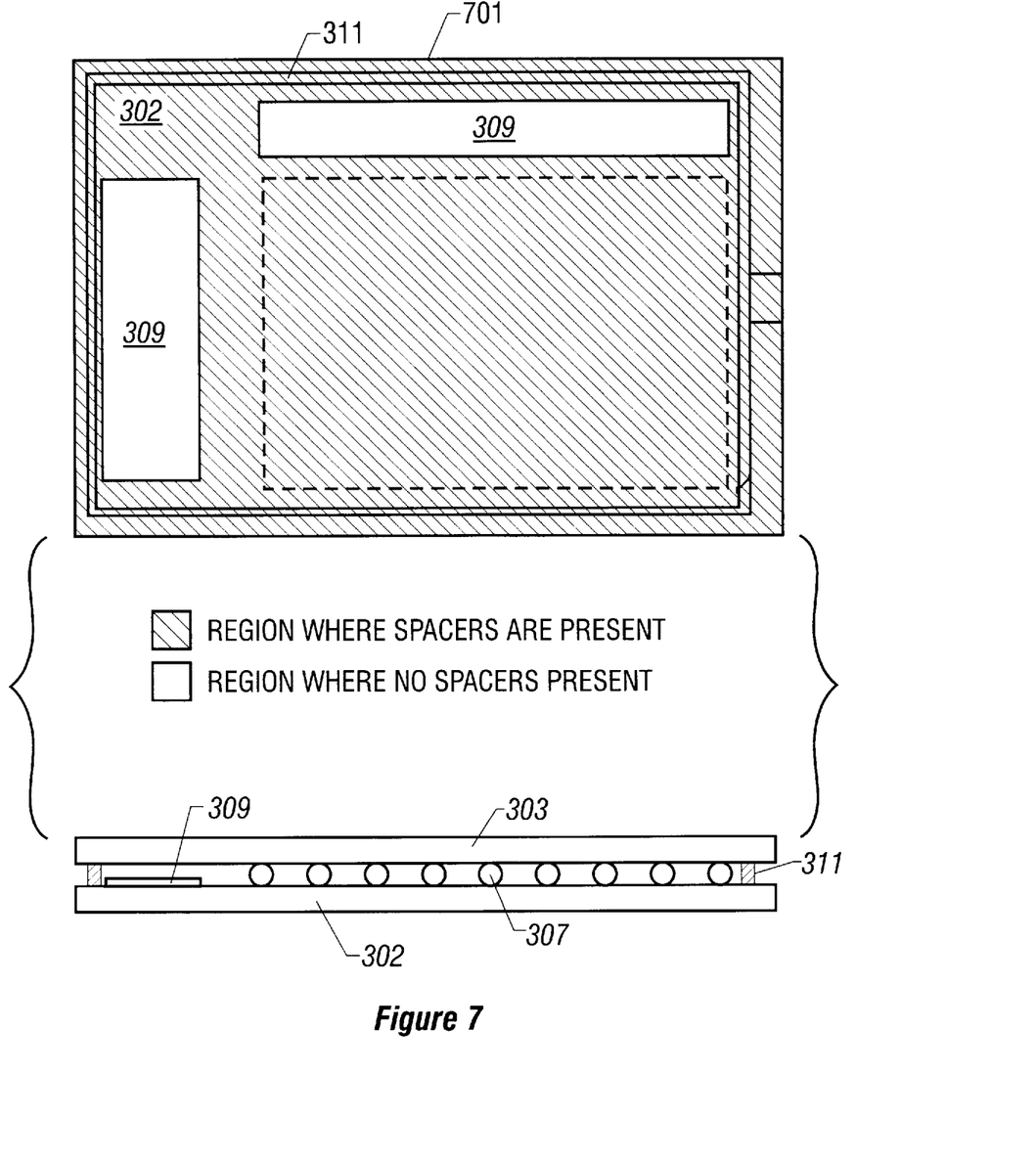
FIG. 7 is a view illustrating a state of spacers on a TFT substrate dispersed using a method in the first embodiment of the present invention.

FIG. 7 shows the region on the TFT substrate where the spacers are dispersed. In the present embodiment, no spacer is present in peripheral driving circuit regions 309, and the spacers are present only in other regions (the area indicated by oblique lines in the figure). The average dispersion density of the spacers in a pixel region 701 is 100 pcs./mm².

The TFT substrate and the color filter substrate are bonded by a sealant 311.

Although not shown, a shading film such as a chromium or aluminum film for blocking light must be formed on the upper surface of the peripheral driving circuit regions.

Because the spacers are not dispersed on the peripheral driving circuits, the liquid crystal display formed as described above exhibits very high strength against an external pressure and can sufficiently protect the peripheral driving circuits from breakage.

Second Embodiment

This embodiment is identical to the first embodiment except the method of dispersing the spacers. Therefore, only the method of dispersion will be described with reference to FIG. 2.

Figure 2:
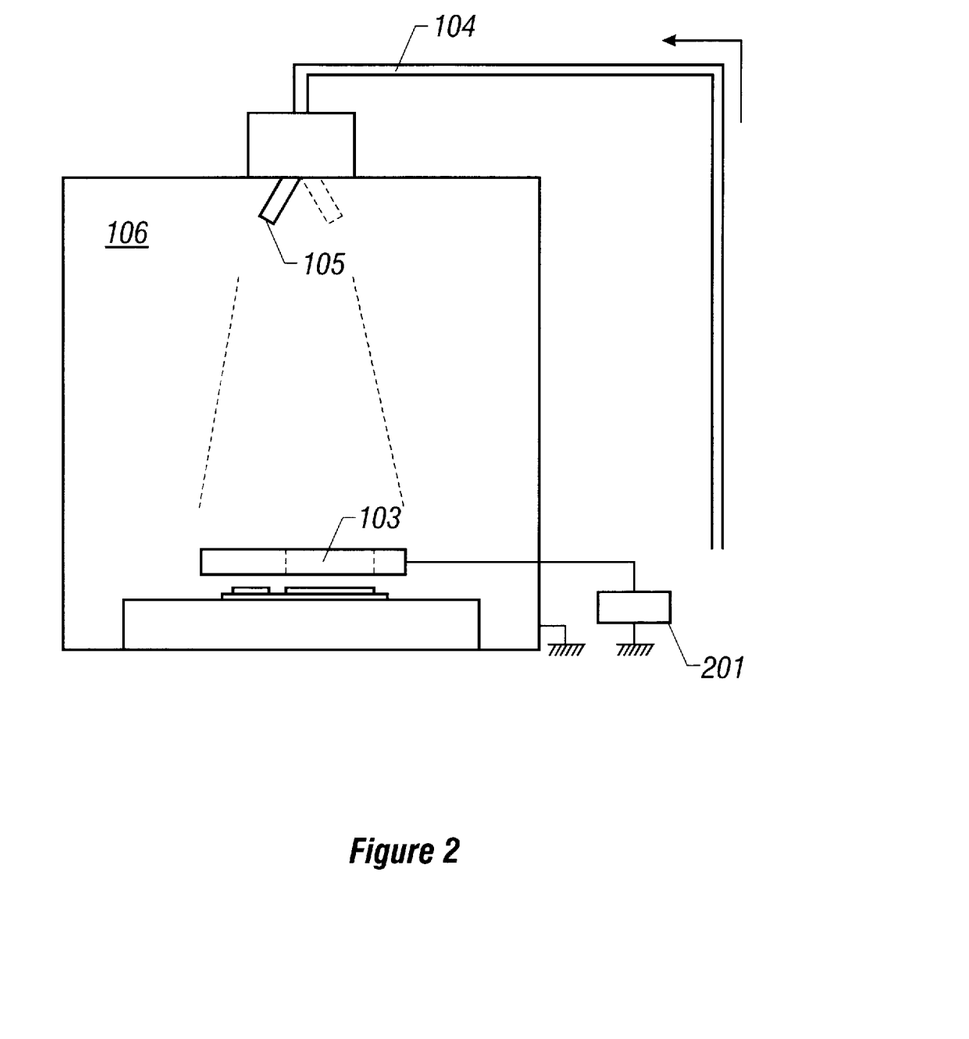
FIG. 2 schematically shows a method of dispersing spacers in a second embodiment of the present invention.

First, the spacers are dispersed on the display region of the substrate 101. The spacers are dispersed using the same dispersing machine as that used in the first embodiment.

Plastic spacers having a diameter of 5.0 μm (Micropearl manufactured by SEKISUI FINE CHEMICAL CO. LTD.) are used as the spacers. The spacers are transported by nitrogen gas and dispersed in the duct 104. The spacers are naturally charged as a result of friction with the duct during transportation.

In order to inhibit the spacers from being dispersed in the area of the driving circuits, as shown in FIG. 2, a mask 202 is provided above the substrate 101 during dispersion such that it does not contact with the substrate. The mask 202 is formed with holes in areas excluding those corresponding to the driving circuits. The shape of the holes is the same as that in the first embodiment. The interval between the substrate and the mask is 1 mm. Further, a conductive material such as a metal is used for the mask to allow a DC electric field to be applied between the mask and the stage. The potential of the mask is made the same as that of the spacers with the stage carrying the substrate serving as a reference. In the present embodiment, a voltage of −1 kV is applied.

FIG. 7 shows the region on the TFT substrate where the spacers are dispersed. In the present embodiment, no spacer is present in the peripheral driving circuit regions 403 and the spacers are present only in other regions (areas indicated by oblique lines). The average dispersion density of the spacers is 100 pcs./mm$^2$.

Because the spacers are not dispersed on the peripheral driving circuits, the liquid crystal display formed as described above exhibits very high strength against an external pressure and can sufficiently protect the peripheral driving circuits from breakage.

Third Embodiment

Figure 6:
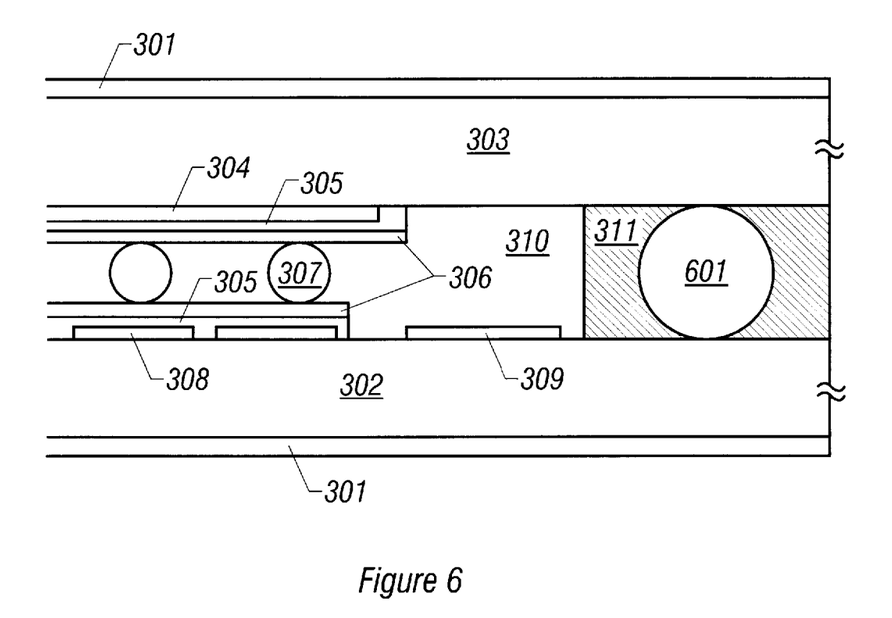
FIG. 6 is a sectional view of an active matrix liquid crystal display of a third embodiment of the present invention.

The present embodiment shows a method for achieving a cell thickness of higher uniformity at steps of assembling an active matrix liquid crystal display using the method of dispersing spacers in the first or second embodiment. FIG. 6 schematically illustrates the present embodiment which is identical to the first or second embodiment except the method of dispersing spacers.

Plastic spacers having a diameter of 5.5 μm (Micropearl manufactured by SEKISUI CHEMICAL CO. LTD.) 601 are mixed in a sealant 311 for bonding the TFT substrate 302 and color filter substrate 303 obtained in the same manner as in the first or second embodiment and for preventing a liquid crystal material injected therein from leaking to the outside. At this time, the sealant is inhibited from covering the peripheral driving circuit 309. Further, the spacers are not limited to the above-mentioned plastic material in this case and, for example, glass, silica or the like may be used.

Next, the substrate 302 and the color filter substrate 303 are laminated and the bonding material is hardened.

Thereafter, the laminated substrates as a whole are put in a decompressed state, and the liquid crystal material 310 is injected and sealed in the display region.

In a liquid crystal display formed as described above, the cell thickness between the TFT substrate 302 and the color filter substrate 303 can be made uniform to obtain preferable display characteristics having no color variation. Further, since the spacers are not dispersed on the driving circuit, it exhibits very high strength against an external pressure and can sufficiently protect the peripheral driving circuits from breakage.

Fourth Embodiment

The present embodiment shows an arrangement to manufacture a plurality of devices from a pair of glass substrates by dividing a active matrix liquid crystal display as described above using the sealant into a plurality of parts during steps of assembling an active matrix liquid crystal display using the method of dispersing spacers according to the first or second embodiment. The present embodiment is identical to the first embodiment except the method of dispersing the spacers.

Figure 8:
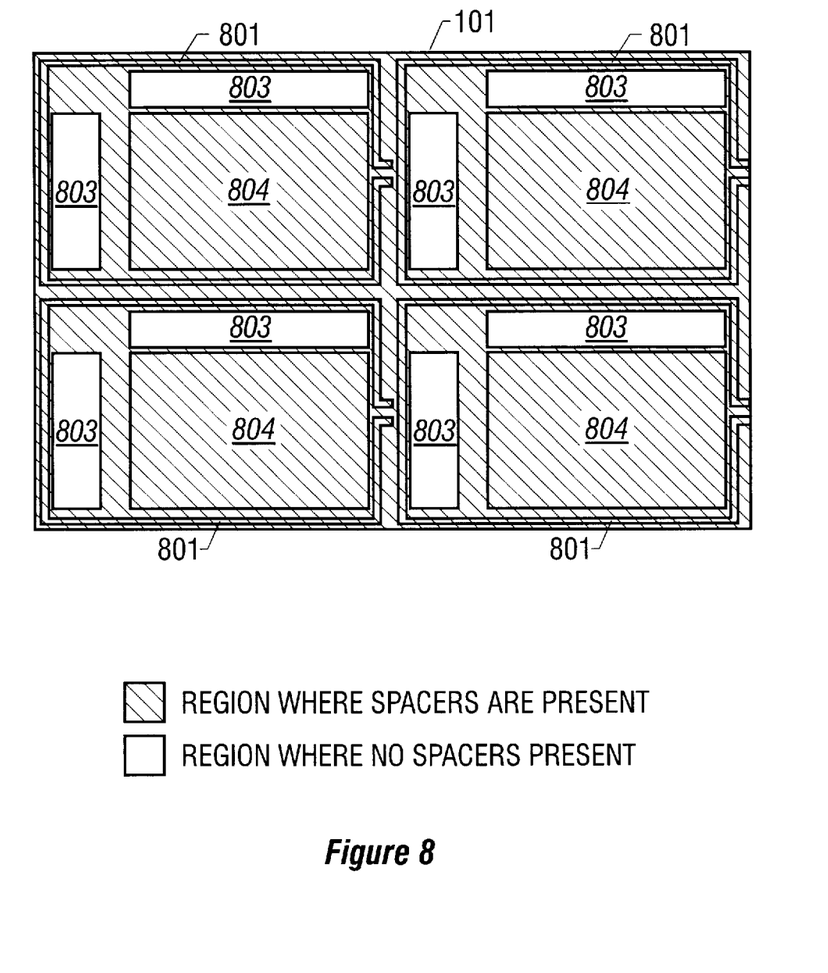
FIG. 8 is a sectional view of an active matrix liquid crystal display of a fourth embodiment of the present invention.

In the present embodiment, a plurality of sets of active matrix display substrates as shown in the first embodiment are configured using a pair of large glass substrates. FIG. 8 shows an example of such a configuration. In FIG. 8, four sets of active matrix display substrates as shown in the first embodiment are configured on the large substrates. The configurations of elements of a pixel region 804 and peripheral driving circuits 803 of each set are the same as those in the first embodiment.

In the present embodiment, as shown in FIG. 8, one substrate is divided into four parts. The sealant used in this embodiment is the same as that in the first embodiment.

Further, the present embodiment employs large glass substrates. In order to make the cell thickness more uniform, the plastic spacers as described in the third embodiment are mixed with the sealant.

The mask used in this case has the holes corresponding to the peripheral driving circuit regions as described in the first and second embodiments which are formed in correspondence to the plurality of sets of peripheral driving circuit regions. FIG. 8 shows the area on the TFT substrates in which the spacers are dispersed when such a mask is used. As in the first and second embodiments, no spacer is present in the peripheral driving circuit regions 803 and the spacers are present only in other regions (the area indicated by oblique lines in the figure). The average dispersion density of the spacers is 100 pcs./mm$^2$.

The sealant is heated and hardened and, thereafter, grooves defining the size of panels are cut in the glass substrates using a scriber. Then, a round member made of urethane is dropped by the pressure of an air cylinder from directly above the grooves on the substrates using a breaker to divide the thin film transistor substrates into a plurality of parts in the size of panels.

Finally, a liquid crystal material is injected from an liquid crystal injection port of each of the active matrix liquid crystal displays consisting of the TFT substrate and the color filter substrate laminated together and, thereafter, the liquid crystal injection port is sealed with epoxy type resin. Thus, a plurality of active matrix liquid crystal displays having a more uniform cell thickness can be produced simultaneously.

By dispersing spacers in peripheral driving circuit regions in a density lower than that in a pixel region, damage to the peripheral driving circuits caused by the spacers can be reduced and the yield of the peripheral driving circuits can be improved.

What is claimed is:

1. An active matrix liquid crystal display comprising:

a first substrate;

an active matrix circuit and a driver circuit for driving the active matrix circuit, both comprising thin film transistors formed over said first substrate;

a second substrate opposed to said first substrate with a gap therebetween, said second substrate covering both of said active matrix circuit and said driver circuit;

spacers distributed both over said active matrix circuit and said driver circuit to maintain said gap between said first and second substrates, wherein a density of said spacers over said active matrix circuit is different from a density of said spacers over said driver circuit.

2. The active matrix liquid crystal display of claim 1 wherein the density of said spacers over said active matrix circuit is larger than the density of said spacers over said driver circuit.

3. An active matrix liquid crystal display comprising:

a first substrate;

an active matrix circuit and a driver circuit for driving the active matrix circuit, both comprising thin film transistors formed over said first substrate;

a second substrate opposed to said first substrate with a gap therebetween, said second substrate covering both of said active matrix circuit and said driver circuit;

spacers distributed over said active matrix circuit to maintain said gap between said first and second substrates, wherein said spacers are not distributed over said driver circuit.

4. A method of manufacturing an active matrix liquid crystal display comprising:

forming an active matrix circuit and a driver circuit for driving the active matrix circuit over a substrate wherein both of said active matrix circuit and said driver circuit comprise thin film transistors;

distributing spacers over said first substrate having said active matrix circuit and the driver circuit thereon; and     mating a second substrate to said first substrate with a gap maintained therebetween by said spacers wherein said second substrate covers both of said active matrix circuit and said driver circuit,     wherein said spacers are distributed so that a density of said spacers over said active matrix circuit is different from a distribution density of said spacers on said driver circuit.

5. A method of manufacturing an active matrix liquid crystal display comprising:

forming an active matrix circuit and a driver circuit for driving the active matrix circuit over a substrate wherein both of said active matrix circuit and said driver circuit comprise thin film transistors;

distributing spacers over said first substrate having said active matrix circuit and the driver circuit thereon; and     mating a second substrate to said first substrate with a gap maintained therebetween by said spacers wherein said second substrate covers both of said active matrix circuit and said driver circuit,     wherein a static electricity is selectively applied to said first substrate during the distribution of the spacers so that a density of said spacers over said active matrix circuit is made different from a density of said spacers over said driver circuit.

6. The method of claim 5 wherein the density of said spacers over said active matrix circuit is larger than the density of said spacers over said driver circuit.

7. The method of claim 5 wherein the static electricity is applied to a stage carrying said substrate.

8. A method of manufacturing an active matrix liquid crystal display comprising:

thin film transistors provided in a pixel region and thin film transistors provided in peripheral driving circuit regions reside on the same substrate,     wherein the dispersion density of the spacers is made different between said pixel region and peripheral driving circuit regions by applying different voltages to said pixel region and peripheral driving circuit regions during distributing said spacers onto said substrate.

9. A method of manufacturing an active matrix liquid crystal display comprising:

forming an active matrix circuit and a driver circuit for driving the active matrix circuit over a substrate wherein both of said active matrix circuit and said driver circuit comprise thin film transistors;

distributing spacers over said first substrate having said active matrix circuit and the driver circuit thereon; and     mating a second substrate to said first substrate with a gap kept therebetween by said spacers wherein said second substrate covers both of said active matrix circuit and said driver circuit,     wherein said spacers are distributed only over said active matrix circuit by covering said driver circuit with a mask during distributing said spacers.

10. A method according to claim 9 wherein said spacers are applied with electric charge during the distribution thereof.

11. A method according to claim 10 wherein said mask is conductive and is applied with a voltage during the distribution of the spacers.

* * * * *